US008686876B2

(12) United States Patent
Shiomori et al.

(10) Patent No.: US 8,686,876 B2
(45) Date of Patent: Apr. 1, 2014

(54) GALLEY CONTROL SYSTEM OF AIRCRAFT (75) Inventors: Jun Shiomori, Tokyo (JP); Hiroyuki Hozumi, Tokyo (JP); Mineo Mizukami, Tokyo (JP)

(73) Assignee: Jamco Corporation, Tokyo (JP)

( * ) Notice: Subject to any disclaimer, the term of this patent is extended or adjusted under 35 U.S.C. 154(b) by 552 days.

(21) Appl. No.: 12/964,026

(22) Filed: Dec. 9, 2010

(65) Prior Publication Data
US 2011/0148664 A1  Jun. 23, 2011

(30) Foreign Application Priority Data

Dec. 22, 2009  (JP) ................. 2009-290042

(51) Int. Cl.
*G08B 21/00* (2006.01)
(52) U.S. Cl.
USPC ........ 340/945; 340/953; 340/963; 244/117 R; 244/118.1; 244/118.5; 398/172
(58) Field of Classification Search
USPC .................. 340/945, 500, 953, 963; 398/172; 392/444, 445; 244/117 R, 118.1, 118.5
See application file for complete search history.

(56) References Cited

U.S. PATENT DOCUMENTS

| | | | | |
|---|---|---|---|---|
| 2003/0067660 | A1* | 4/2003 | Oda et al. ............ | 359/172 |
| 2005/0070152 | A1* | 3/2005 | Suzuki et al. .......... | 439/501 |
| 2005/0074231 | A1* | 4/2005 | Suzuki et al. .......... | 392/444 |
| 2005/0121978 | A1* | 6/2005 | McAvoy .............. | 307/43 |

FOREIGN PATENT DOCUMENTS

| | | |
|---|---|---|
| EP | 1 519 450 A2 | 3/2005 |
| JP | 2003-115803 A | 4/2003 |
| JP | 2005-104182 A | 4/2005 |
| JP | 2008-227944 A | 9/2008 |
| JP | 2008-271317 A | 11/2008 |

OTHER PUBLICATIONS

Extended European Search Report dated Jun. 3, 2013, issued in corresponding European Patent Application No. 10405234.5.

* cited by examiner

*Primary Examiner* — Steven Lim
*Assistant Examiner* — Sisay Yacob
(74) *Attorney, Agent, or Firm* — Westerman, Hattori, Daniels & Adrian, LLP

(57) ABSTRACT

A control system is provided that adopts a communication network using wireless visible light and IR light communications in a galley of an aircraft which is subjected to limitations of aviation regulations regarding wired communications. Insert equipments each having a visible light receiving element and an IR emitting element are disposed in a galley of an aircraft, and a galley controller is disposed within the galley or a circumference area thereof having a visible light emitting panel, an IR receiving element and a display/control panel for controlling the insert equipments. A mutual communication function between the galley controller and the insert equipments and a remote control function for controlling the insert equipments from the galley controller are realized via transmission and reception of visible light communication data and IR communication data.

4 Claims, 5 Drawing Sheets

GALLEY CONTROL SYSTEM OF AIRCRAFT

The present application is based on and claims priority of Japanese patent application No. 2009-290042 filed on Dec. 22, 2009, the entire contents of which are hereby incorporated by reference.

BACKGROUND OF THE INVENTION

1. Field of the Invention

The present invention relates to a control system of a galley installed in an aircraft.

2. Description of the Related Art

Conventionally, there are various galley-mounted equipments (hereinafter referred to as "insert equipments") disposed in a kitchen facility (hereinafter referred to as "galley") on an aircraft. The respective insert equipments have their own dedicated control panels, and the equipment is usually manipulated through the control panels. Therefore, it was not possible to provide control commands integrally for controlling the multiple insert equipments, or to monitor the insert equipments collectively. Therefore, a control system for correctly controlling these insert equipments in a short time in a prompt manner is desired.

However, in order to realize such a control system, it is necessary to constitute a certain communication system within the aircraft so as to enable frequent exchange of information between the respective insert equipments and the controller (display/control panel). Since the existing control system installed in the aircraft is subjected to complex and bothersome aviation communication restrictions, it was not easy to constitute a communication system between the insert equipments and the controller.

Therefore, a local communication network is to be constructed in order to establish an information and telecommunication with which the controller monitors and operates the insert equipment. It is expected that such galley control system is to be constructed into aircraft.

A proposal to adopt a Controller-area network (CAN bus) as a communication means for a galley control system of an aircraft has been deliberated in ARINC (ARINC project paper 812; Definition of Standard Data Interfaces for Galley Insert (GAIN); Equipment; CAN Communications), but it has not yet been officially announced. In the proposal of ARINC specification 812, a galley data bus network is constructed between insert equipments and a master galley control unit (MGCU) as master via a CAN bus interface for performing mutual communication and exchanging information, and necessary information is communicated with the aircraft system by connecting to the communication network of the aircraft via the MGCU. Special attention is given to the point that a peak of the total consumption power at meal time during which all the insert equipments are used at the same time can be reduced and dispersed by adjusting the start time of operation of the insert equipments through the network, which is considered to be an indispensible method for reducing the capacity of the generator disposed on the aircraft and saving energy.

There is another proposal related to utilizing the network of the galley data bus as a local network for controlling the insert equipments within the galley. Such art can be realized by additionally providing a CAN bus interface to the insert equipments, arrange a CAN bus wiring within the main body of the galley and disposing a MGCU additionally.

On the other hand, along with the diversification of lighting devices, much attention is recently given to an illumination light communication system that does not use the CAN bus interface. Japanese patent application laid-open publication No. 2008-271317 (patent document 1) discloses an example of an illumination light communication system enabling a large amount of data to be transmitted at high speed. According to the disclosed illumination light communication system, a transmitter emits modulated light that is modulated in accordance with data to be transmitted from an organic electroluminescence (EL) light source (commonly known as "OLED": organic light-emitting diode). A receiver receives the modulated light emitted from the OLED, converts the received light into an electric signal and demodulates data from the converted electric signal. Since the system adopts an organic EL element formed of a material having a high speed response performance as the illumination light source of the illumination light communication system, the system can increase the amount of data transmission per unit time compared to a white light-emitting diode (LED), for example, and can transmit a large amount of data at high speed.

Further, Japanese patent application laid-open publication No. 2003-115803 (patent document 2) proposes a light emitting device and a communication system including the same, in which the communication speed is accelerated in a communication using light. According to the communication system, the light emitting device is provided with a light emitting element capable of transmitting signal light composed of light modulated on the basis of input data, the light emitting element being an EL element. Further, the light emitting element emits non-signal light composed of non-modulated light and signal light in different periods, wherein the non-signal light also functions as illumination. Further, the signal light also functions as illumination. Moreover, a means for storing transmitted information is connected to a light receiving element, for storing and writing in transmitted information.

Further, Japanese patent application laid-open publication No. 2008-227944 (patent document 3) proposes a receiver for visible light communication which does not require supply of power, and a visible light communication system using the same. Data transmission equipment modulates the driving current of lighting element (LED) with the received data, and changes the level of the light of LED according to the driving current. The data receiver detects the received illumination light from a change of output of a solar cell panel, demodulates this detected signal, and displays the demodulated data on a display section.

On the other hand, a communication system using infrared light is widely used in private households. Recently, much attention is given to visible light communication using visible light, along with the widespread use of illumination equipments using elements having good optical response such as LED and OLED. Visible Light Communications Consortium (VLCC) and Infrared Data Association (IrDA) have published on Mar. 6, 2009 a "visible light communication standard" version 1.0 compatible with the IrDA communication system.

In order to realize a control system for controlling insert equipments used within the galley, it is necessary to construct some type of control system as proposed in ARINC specification 812 and to enable frequent data exchange between the respective insert equipments and the controller (display/control panel) disposed on the aircraft. However, the controller disposed on the aircraft already has a constructed network for performing control operation of the aircraft, and in order to communicate with this network and exchange information with the aircraft, it is necessary to design a system satisfying the aviation communication regulations and having a high reliability. However, such control system integrated with the aircraft system could not be realized easily at a low cost.

On the other hand, a system having given up the communication with the aircraft system and constructed as a network using a CAN bus as a local communication system, such as the one proposed in ARINC specification 812 for enabling communication between the insert equipments within the galley and a controller, a failure caused by wire connection may occur. The respective electronic equipments including the network environment within the galley must satisfy a series of regulations regarding a sequence of typical environment testing conditions determined to comply with aviation regulations, such as an RICA/DO•160 standard specification determined by the special committee of the Radio Technical Commission for Aeronautics. Especially in section 21.0 of RICA/DO 160, there is a standard specification regarding radio frequency (RF) energy emission which restricts radiated RF emission and conducted RF emission of electromagnetic noises leaking from electronic equipments, and at present, much work and costs are required to comply with this regulation. The CAN bus interface is not an exception and the regulations related to the standard specification of radio frequency energy emission cannot be avoided easily.

As described, there are various problems to be solved in designing a simple and inexpensive network system, and such system has not yet been realized. We consider that the construction of a wireless communication network that does not use any wired electric signal communication is most appropriate as a galley control system. Optical communication using no wires is considered to function sufficiently within the narrow galley space. In order to perform mutual communication between the insert equipments and the controller, it is necessary to realize a mutual direction communication using two kinds of lights. For example, a visible light and an infrared light can be used.

SUMMARY OF THE INVENTION

This invention describes the method of composing the galley control system by constructing the optical communication network where a radiated RF emission and conduction RF emission that becomes a problem in the wired network are not generated, and using this in the galley for the aircraft.

The purpose of this invention offers the control system by the optical communication network to the galley for the aircraft, and makes each insert equipment function more efficiently and more certainly.

In order to solve the above-mentioned problems, the present invention provides a galley control system of an aircraft comprising an insert equipment having a visible light receiving element and an infrared (hereinafter referred to as "IR") emitting element and disposed in the galley of an aircraft, and a galley controller for controlling the insert equipment disposed in the galley or in a circumference thereof and having a visible light emitting panel, an IR receiving element and a display/control panel, wherein the galley control system is equipped with a mutual communication function between the galley controller and the insert equipment and a remote control function for controlling the insert equipment from the galley controller via transmission of visible light communication data from the visible light emitting panel of the galley controller to the visible light receiving element of the insert equipments and via transmission of IR communication data from the IR emitting element of the insert equipment to the IR receiving element of the galley controller.

According to the above-described galley control system of an aircraft, the insert equipments disposed in the galley of an aircraft and the galley controller disposed within the galley or in the circumference area thereof can either mutually communicate via visible light and IR light and, as a result, be designed so that the galley controller can remote control the insert equipments in a wireless manner.

According further to the galley control system of an aircraft, the visible light emitting panel of the galley controller has both the function to emit light for transmitting visible light communication data to the insert equipment and a function to emit light for illuminating the interior of the galley. The visible light emitting panel can have both a visible light communication function and an illuminating function for illuminating the galley, so that the use of such equipment having multiple functions contributes to reducing the number of components, reducing weight, and saving the space within the aircraft.

According to the galley control system of an aircraft, the visible light receiving sensor and the IR emitting element of the insert equipment is disposed on a front panel thereof, and the visible light emitting panel and the IR receiving element of the galley controller is either disposed to face the front panel of respective insert equipments or on a ceiling or at a high position close to the ceiling within the galley or in a circumference area thereof. By disposing the visible light emitting panel and the IR receiving element of the galley controller at a position facing the front panel of the respective insert equipments, communication is enabled by minimizing the possibility of visible light and IR light for communication being blocked between the galley controller and the respective insert equipments. Furthermore, by disposing the visible light emitting panel and the IR receiving element of the galley controller at an appropriate position on or near the ceiling of the galley or in the circumference area thereof, communication is enabled by minimizing the possibility of visible light and IR light for communication being blocked between the insert equipments and the galley controller, by emitting light from the ceiling or near the ceiling above the respective insert equipments and by emitting light toward the ceiling or near the ceiling.

In the present galley control system of an aircraft, a deflection angle conversion element for changing a deflection angle of visible light and IR light entering or exiting the insert equipment is disposed on an upper surface of the visible light receiving sensor and the IR emitting element of the insert equipment. By attaching light deflection elements on the visible light receiving and visible light emitting elements disposed on the front panel of the insert equipments and using the same, it becomes possible to solve the problem of orientation of the lights when visible light and IR light are used as means for communication, that is, the communication accuracy can be improved by aligning the deflection angles thereof.

According to the galley control system of an aircraft of the present invention, upon executing the remote control function, the insert equipment receives information for enabling the remote control function from the galley controller and transmits a own operating status information related to the remote control function to the galley controller within a given period of time. And according to this aspect of the present invention, information related to executing the remote control function from the galley controller to the insert equipments can be communicated between the galley controller and the insert equipments.

According to the present galley control system of an aircraft, a control switch for performing operation setup and manipulation of the remote control function of the insert equipment is provided on the display/control panel of the galley controller.

According further to the present galley control system of an aircraft, the galley controller is equipped with a memory for storing information transmitted from the insert equipment, and the galley controller displays necessary information included in the received information on the display/control panel to enable operation statuses of respective insert equipments to be monitored collectively. Moreover, the galley controller can output an alarm or a warning to the circumference if necessary based on the monitored operation statuses of the insert equipments.

According to the present galley control system of an aircraft, a back light of the display/control panel can be used instead of the visible light emitting panel of the galley controller for transmitting the visible light communication data.

Construction of a network using wires within the galley of an aircraft requires much time and costs to comply with the restrictions of aviation regulations and the cost-related effect is deteriorated thereby, while the galley control system of an aircraft according to the present invention having the above-described aspects constructs a wireless optical communication network using visible light and IR light, according to which a network free from restrictions of aviation regulations can be constructed. Therefore, the cost-related effect can be improved by suppressing the costs related to constructing the communication network.

DETAILED DESCRIPTION OF THE PREFERRED EMBODIMENTS

Now, the preferred embodiments of a galley control system of an aircraft according to the present invention will be described with reference to the drawings.

Figure 1:
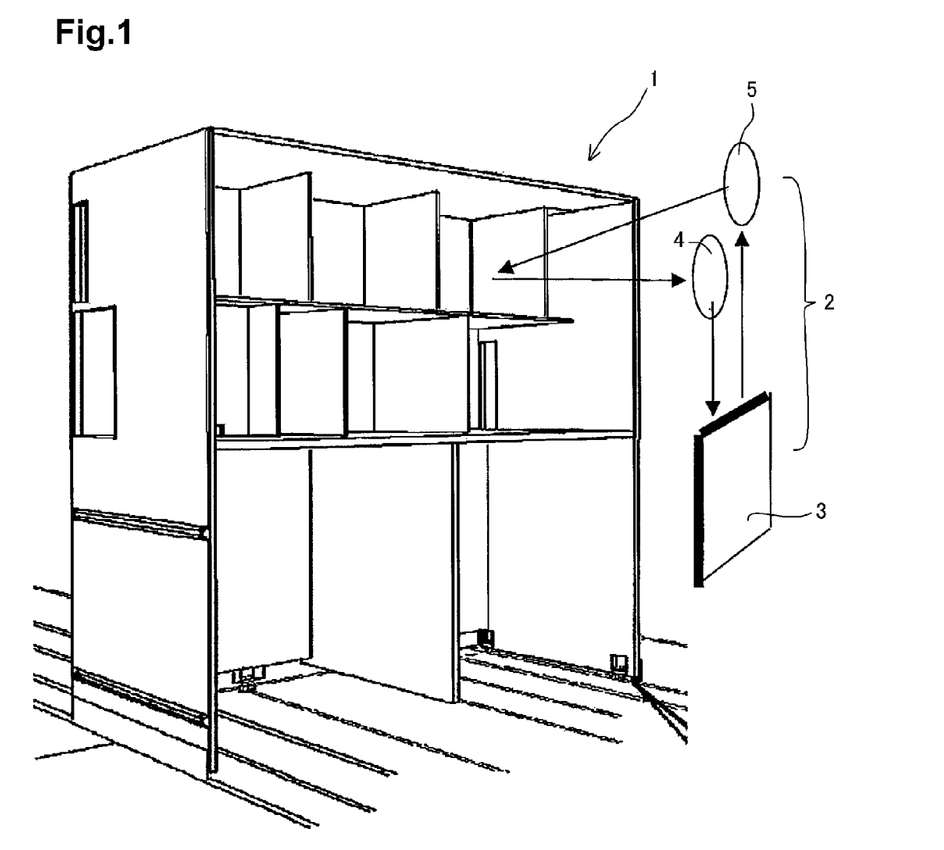
FIG. 1 is an image showing an optical communication between a galley of an aircraft and a control system to which a galley control system of an aircraft according to the present invention is applied.

FIG. 1 shows in perspective view an example of an outline of a galley of an aircraft to which the galley control system according to the present invention is applied. A galley of an aircraft is a kitchen facility disposed within an aircraft, having a large number of insert equipments (galley hardware) such as ovens, microwaves, coffee brewers, freezers and refrigerators for storing cooled or frozen food, heating food, or making coffee, tea and other beverages. There are no insert equipments illustrated in the galley in FIG. 1, but in general, ovens, microwave ovens, coffee brewers and other cooking equipments are disposed on the upper shelf, and freezers, refrigerators and other storage equipments are disposed on the lower shelf.

The galley of an aircraft has a very compact size so as not to take up much space in a passenger aircraft. On the other hand, cabin attendants on board the aircraft are constantly entering and exiting the galley to respond to the needs of passengers or to provide service to the passengers, and various operations such as inserting, cooking, and removing food and drinks from various insert equipments are performed frequently in the galley. Therefore, it is bothersome to respectively manipulate the various insert equipments by entering the galley, and the complication within the galley of the aircraft can be solved if the insert equipments can be controlled collectively via a galley controller.

As shown in FIG. 1 illustrating the image of a visible light and IR light optical communication of the galley control system, a display/control panel 3 of a galley controller 2 is disposed at a given position within a galley 1 of an aircraft. The galley controller 2 controls a plurality of insert equipments (preferably all the equipments disposed in the galley) through manipulation of the display/control panel 3, which enables to control the operation of insert equipments through mutual communication or via remote control. Visible light communication is a communication means making use of the blind spot that the human eyes cannot sense the change of visible light luminosity in short periods (approximately 1 ms or shorter).

A visible light emitting panel 4 or an IR receiving element 5 disposed in the galley controller 2 for controlling transmission and reception of communication with insert equipments are disposed within or near the galley 1 of an aircraft at a high position such as on a ceiling or near the ceiling. Since transmission and reception of visible light and IR light for communication with various insert equipments disposed within the galley 1 of an aircraft is performed from such a high position, it becomes possible to prevent transmission and reception errors caused by visible light and IR light being blocked for a long period of time by cabin attendants entering and exiting the galley 1 of the aircraft.

Figure 2:
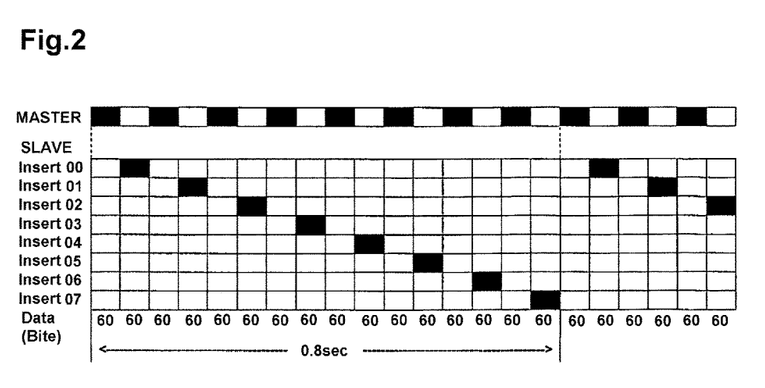
FIG. 2 is an image showing the data communication between a controller (master) and an insert equipment (slave) in the galley control system of an aircraft shown in FIG. 1.

FIG. 2 is a chart showing the order of data transmission between a controller (master) and insert equipments (slave) in a galley control system of an aircraft according to the present invention. It shows that when the data transfer quantity of data communication is 7 bits, the frame length is 60 bites, the number of slaves is eight, and the data communication speed is 9600 bps, the time required for a single communication cycle in which the communication between the master and eight slaves takes a round is 0.8 seconds. After communication from the master to a specific slave is performed, the slave sends a response to the master, and such transmission and reception of data is performed sequentially for all the respective slaves. Upon executing the remote control function, the insert equipments receive information related to enabling the remote control function from the galley controller 2, and transmits a own operating status information related to the remote control function to the galley controller 2 within a given period of time.

Figure 3:
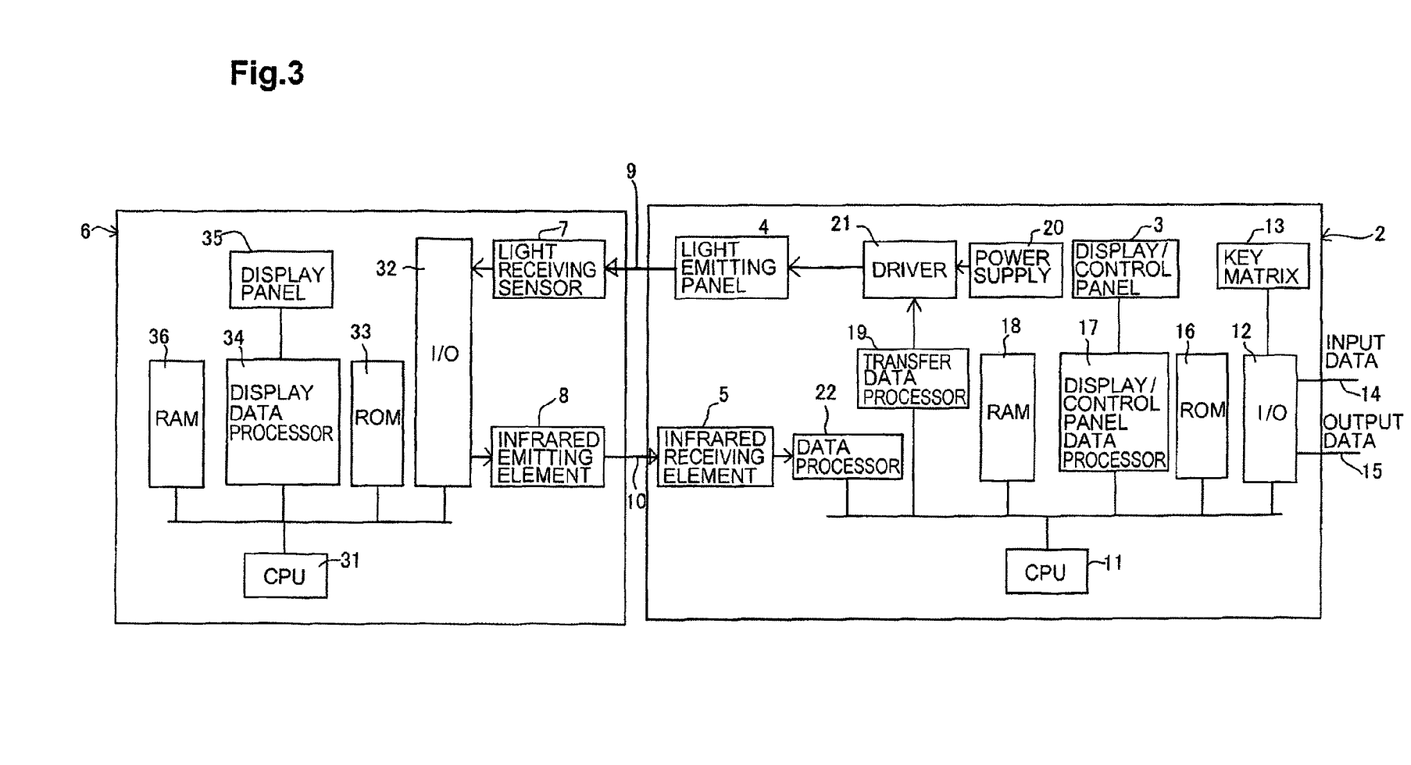
FIG. 3 is a block diagram showing the galley control system of an aircraft illustrated in FIG. 1.

FIG. 3 is a view showing one example of a system block of the galley control system of an aircraft according to the present invention. The galley controller 2 comprises a display/control panel 3, a visible light emitting panel 4, an IR receiving element 5 and a CPU 11, wherein the CPU 11 is connected to an input/output interface 12 connected to a key matrix 13 and receiving input of input data 14 and outputting output data 15, a ROM 16, a display/control panel data processor 17 for controlling the display/control panel 3, a RAM 18 as memory, a transfer data processor 19 for controlling a driver 21 for driving the visible light emitting panel 4 by receiving supply of power from a power supply 20, and a data processor 22 for processing data received via the IR receiving element 5.

On the other hand, the insert equipment 6 is equipped with a visible light receiving sensor 7 which is a visible light receiving element for receiving visible light communication data 9 sent from a visible light emitting panel 4 disposed on the galley controller 2, and an IR emitting element 8 for transmitting IR light communication data 10 to the IR receiving element 5 disposed on the galley controller. A visible light sensor such as an amorphous silicon can be used as the visible light receiving sensor 7 for receiving the visible light subjected to luminosity modulation via communication data, according to which the communication data contained in the visible light can be identified. At this time, the identification of communication data is affected if other visible light sources exist in the surrounding area, so extra attention is required. The insert equipment 6 further includes a CPU 31 for controlling the overall equipment, wherein the CPU 31 is connected to an input/output interface 32 connected to the visible light receiving sensor 7 and the IR emitting element 8, a ROM 33, a display data processor 34 for controlling the display panel 35, and a RAM 36.

The IR light communication data transmitted from the IR emitting element 8 of each insert equipment 6 must not interfere with the visible light spectrum (380 nm to 780 nm in normal wavelength) emitted as transmission light from the visible light emitting panel 4 on the galley controller 2. In other words, special care is required since the IR receiving element 5 may have a region that responds to visible light (the generally used wavelength region is a short wavelength region from 750 nm to 1000 nm, which overlaps with the visible light region). In order to correctly perform the identification of various insert equipments 6, an ID indicating which position within the galley 1 of the aircraft the insert equipment 6 is disposed is provided, and the insert equipment 6 corresponding to the ID is associated when performing communication. For example, an installation position information corresponding to an ID code is provided to a vacant pin of a connector through which the insert equipment 6 receives power supply from the galley 1 of the aircraft, and the slave (insert equipment 6) having received a call from the master (galley controller 2) via the ID code starts communication. When a response from a slave cannot be recognized during start up of the system, that specific ID is skipped thereafter during operation.

Figure 4:
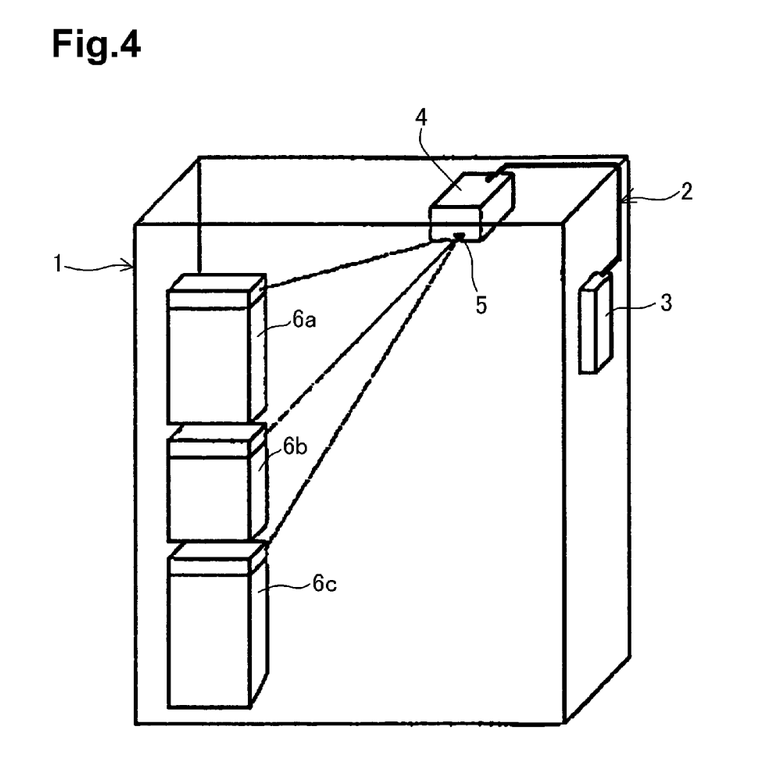
FIG. 4 is an image showing the installation of the insert equipments and the galley controller according to the galley control system of an aircraft illustrated in FIG. 3.

FIG. 4 is an image showing how the insert equipments and the galley controller are disposed according to the galley control system of an aircraft according to the present invention. A plurality of insert equipments 6a, 6b and 6c are disposed in the galley 1 of an aircraft, wherein the insert equipments 6a through 6c include visible light receiving sensors 7 and IR emitting elements 8 disposed on front panels thereof.

On the other hand, a common galley controller 2 for performing control of the insert equipments 6a through 6c is disposed in the galley 1 of an aircraft. The galley controller 2 has a visible light emitting panel 4 for transmitting visible light communication data to the insert equipments 6a through 6c, and an infrared receiving element 5 for transmitting infrared communication data from the insert equipments 6a through 6c, wherein the visible light emitting panel 4 and the infrared receiving element 5 are either disposed to face the front panels of the insert equipments 6a through 6c or disposed on a ceiling or a high position near the ceiling or near the galley 1 of an aircraft, as illustrated. Therefore, nothing will interrupt the visible light and IR light between the front panels of the insert equipments 6a through 6c and the visible light emitting panel 4 and the IR receiving element 5 at any given point of time, and therefore, visible light and IR light communication can substantially be ensured. The visible light emitting panel 4 is considered to use elements such as organic ELs and LEDs having a good response, which is disposed on the ceiling of the galley, so that the panel 4 can also have a visible light emitting function for illuminating the interior of the galley 1 of an aircraft.

The galley controller 2 is equipped with a display/control panel 3 connected via wires with the visible light emitting panel 4 and the IR receiving element 5. The height and position of the display/control panel 3 is determined so as to enable cabin attendants to easily view and manipulate the panel. Since elements such as organic EL and LED having a good response is also used as the backlight of the display/control panel 3, the panel 3 can be used instead of the visible light emitting panel 4 of the galley controller 2 for illuminating and for transmitting visible light communication data, by supplying signals of a driver 21 to the visible light emitting element of the display/control panel 3 and providing a panel surface luminance of approximately 1000 cd/m$^2$.

Figure 5:
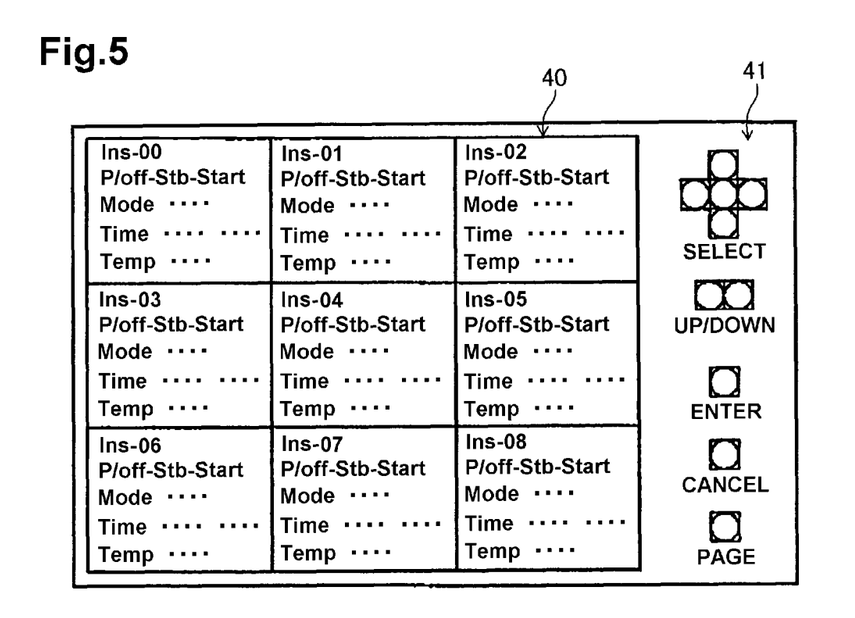
FIG. 5 is an image showing a display/control panel of a controller according to the galley control system of an aircraft of the present invention.

FIG. 5 is an image showing one example of a display/control panel of a galley controller. The display/control panel 3 includes a display 40 displaying the operation statuses of specific equipments such as the mode, time and temperature etc. corresponding to the respective insert equipments (nine equipments denoted by numbers 00 through 08 according to the illustrated example) disposed in the galley 1 of an aircraft. The galley controller 2 has a memory for storing information transmitted from the insert equipments, wherein the galley controller 2 displays necessary information out of the received information on the display/control panel 3, so as to collectively monitor the operation statuses of the insert equipments 6. The galley controller 2 can further output an alarm or a warning if necessary to the surrounding area based on the monitored operation statuses of the insert equipments 6. The display/control panel 3 has a row of manipulation switches 41 including a select switch, an up/down switch, an enter switch, a cancel switch and a page switch, and through these switches, the operator can set and manipulate the operation during execution of a remote control function of the insert equipments 6.

Figure 6:
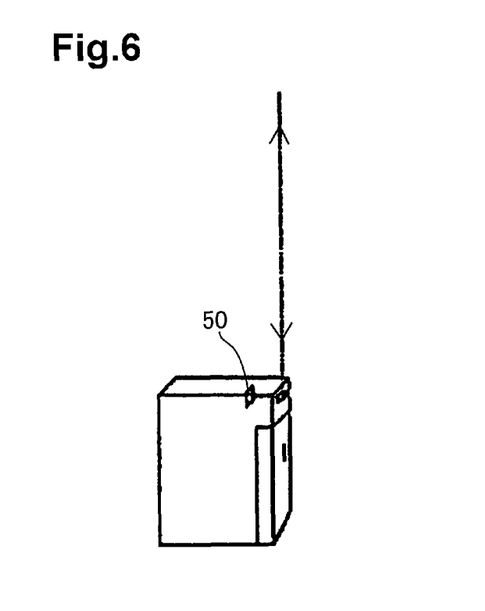
FIG. 6 is an image showing a deflection angle conversion element of a front panel of an insert equipment according to the galley control system of an aircraft of the present invention.

FIG. 6 is an image illustrating the state in which a deflection element is disposed on a front panel of an insert equipment. On an upper side of a front panel having the visible light receiving sensor 7 and the IR emitting element 8 of the insert equipment 6 is disposed a deflection angle conversion element 50 composed of a prism or a mirror for changing the deflection angle of the entering or exiting visible light and IR light. The directions of the visible light and the IR light entering or exiting the visible light receiving sensor 7 and the IR emitting element 8 can be changed from the horizontal direction to the perpendicular upper direction (or from the perpendicular upper direction to the horizontal direction) by using the deflection angle conversion element 50 to deflect the directions of the visible light and the IR light by 90 degrees as shown in the drawing, so that the visible light emitting panel 4 and the IR receiving element 5 of the galley controller 2 can be disposed directly above the insert equipments 6.

The deflection angle conversion element 50 has a function to monitor the amount of received light of the visible light receiving sensor 7 via a display on the front panel of the insert equipment 6 and to adjust the angle so that the amount of received light becomes maximum, in order to perform visible light and IR light communication at a more precise position. According to one example of such mechanism, the mounting angle of the deflection angle conversion element 50 with respect to the insert equipment 6 can be varied along a long hole (long circular hole) and the deflection angle conversion element 50 can be fixed within the long hole at a position where the amount of received light becomes maximum.

What is claimed is:

1. A galley control system of an aircraft comprising:
   an insert equipment having a visible light receiving element and an IR emitting element and disposed in the galley of an aircraft; and
   a galley controller for controlling the insert equipment disposed in the galley or in a circumference thereof and having a visible light emitting panel, an IR receiving element and a display/control panel,
   wherein the galley control system is equipped with a mutual communication function between the galley controller and the insert equipment and a remote control function for controlling the insert equipment from the galley controller via transmission of visible light communication data from the visible light emitting panel of the galley controller to the visible light receiving element of the insert equipment and via transmission of IR communication data from the IR emitting element of the insert equipment to the IR receiving element of the galley controller,
   the visible light emitting panel of the galley controller has both the function to emit light for transmitting visible light communication data to the insert equipment and a function to emit light for illuminating the interior of the galley,
   the visible light receiving sensor and the IR emitting element of the insert equipment are disposed on a front panel thereof, and the visible light emitting panel and the IR receiving element of the galley controller is either disposed to face the front panel of respective insert equipments or on a ceiling or at a high position close to the ceiling within the galley or in a circumference area thereof, and
   the insert equipment is provided with an ID for correctly performing identification of various insert equipments, and the insert equipment corresponding to the ID is associated when performing communication.

2. The galley control system of an aircraft according to claim 1, wherein
   a deflection angle conversion element for changing a deflection angle of visible light and IR light entering or exiting the insert equipment is disposed on an upper side of the visible light receiving sensor and the IR emitting element of the insert equipment, and the deflection angle conversion element is provided with a mechanism for varying a mounting angle of the deflection angle conversion element, in order for the insert equipment to perform visible light and IR light communication at a precise position.

3. The galley control system of an aircraft according to claim 1, wherein
   a back light emission of the display/control panel is used instead of the visible light emitting panel of the galley controller for illuminating the interior of the galley and for transmitting the visible light communication data.

4. The galley control system of an aircraft according to claim 2, wherein
   a back light emission of the display/control panel is used instead of the visible light emitting panel of the galley controller for illuminating the interior of the galley and for transmitting the visible light communication data.

* * * * *